United States Patent
Wilcox et al.

[19]

[11] Patent Number: 5,971,555
[45] Date of Patent: Oct. 26, 1999

[54] HITCH VIEWING MIRROR ASSEMBLY AND METHOD

[76] Inventors: Larry M. Wilcox, 3811 Taylor Ave., Bellingham, Wash. 98226; Donald L. Musselman, P.O. Box 1935, Ferndale, Wash. 98248

[21] Appl. No.: 08/944,063

[22] Filed: Oct. 1, 1997

Related U.S. Application Data

[60] Provisional application No. 60/027,044, Oct. 2, 1996.

[51] Int. Cl.⁶ .................................................. G02B 7/182
[52] U.S. Cl. ........................... 359/872; 359/881; 248/467; 248/480
[58] Field of Search .................................... 359/841, 870, 359/872, 881, 854, 855; 248/476, 480, 486; 224/559

[56] References Cited

U.S. PATENT DOCUMENTS

| | | | |
|---|---|---|---|
| 1,782,175 | 11/1930 | Pearmain . | |
| 1,855,095 | 4/1932 | Campbell | 359/855 |
| 2,112,399 | 3/1938 | Graham | 359/854 |
| 3,295,914 | 1/1967 | Dietrich | 359/881 |
| 3,858,966 | 1/1975 | Lowell, Jr. | 359/881 |
| 4,163,606 | 8/1979 | Granno | 359/881 |
| 4,936,669 | 6/1990 | Wun | 359/841 |
| 4,951,913 | 8/1990 | Quesada | 248/485 |
| 5,111,342 | 5/1992 | Quesada | 359/872 |
| 5,137,158 | 8/1992 | Brockway | 211/87 |
| 5,180,182 | 1/1993 | Haworth | 359/844 |
| 5,235,468 | 8/1993 | Stephens | 359/841 |
| 5,313,337 | 5/1994 | Byers | 359/872 |
| 5,482,310 | 1/1996 | Staggs | 280/477 |
| 5,625,500 | 4/1997 | Ackerman | 359/841 |
| 5,784,213 | 7/1998 | Howard | 359/881 |

*Primary Examiner*—Thong Nguyen
*Assistant Examiner*—Euncha Cherry
*Attorney, Agent, or Firm*—Hughes & Schacht, P.S.; Robert B. Hughes

[57] ABSTRACT

A mirror assembly comprising a U shaped perimeter frame and a planar mirror pivotally mounted to the frame. To mount the mirror assembly to the vehicle, there are a plurality of suction cups adjustably mounted at various locations along the frame so that these can be moved to the proper position. The angular position of the frame is set by means of a positioning arm pivotally connected to the frame and slide mounted to the U shaped frame. The assembly is arranged so that the mirror and the mounting arm can be moved to a collapsed position so as to lie within the plane defined by the frame.

20 Claims, 4 Drawing Sheets

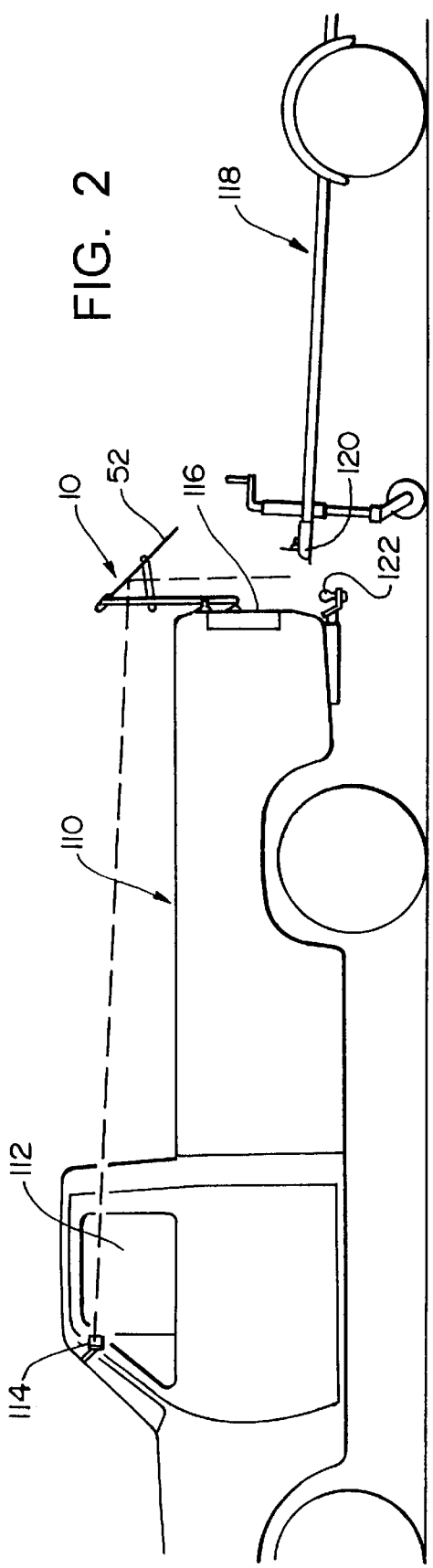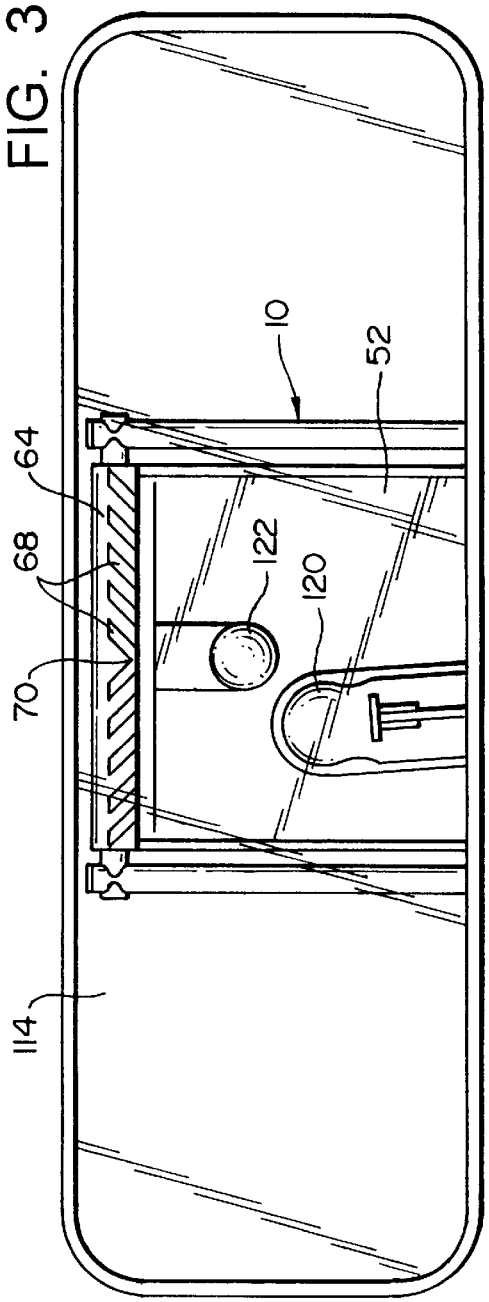

HITCH VIEWING MIRROR ASSEMBLY AND METHOD

This application claims the priority of provisional application Ser. No. 60/027,044, filed Oct. 2, 1996.

BACKGROUND OF THE INVENTION a) Field of the Invention

The present invention relates to a hitch viewing mirror assembly and method, where the mirror assembly can be mounted at the rear end of a vehicle in a manner to provide the driver of the vehicle a view of the hitching area at the rear end of the vehicle.

b) Background Art

The common way of connecting a towing vehicle to a trailer is to provide at the rear end of the towing vehicle a ball hitch, which engages a connecting socket member of the trailer. To make the hitch connection, the vehicle is backed toward the trailer so that the ball hitch is aligned in front of the trailer socket connection, and then is moved to a location just beneath the socket of the trailer hitch connection. After this, the front end of the trailed is lowered to make the ball and socket connection. This usually requires two people to accomplish this task effectively.

Various devices have been proposed to enable the driver to more effectively align the vehicle with the trailer hitch connection and move the vehicle to the proper hitching location. One method is to provide a viewing mirror located at the rear end of the vehicle or at the forward end of the trailer, so that the driver is provided with a line of sight from the driver forwardly to the rear view mirror at the driver location, back to hitch connection mirror and then to the hitching location. A review of the U.S. patent literature has revealed a number of these patents, which are the following:

U.S. Pat. No. 5,482,310 (Staggs) discloses a trailer hitch mirror alignment device where the mirror 70 is mounted to a pair of extendable arms. The base plate by which the device is mounted to the back of a pickup truck or some other object has magnets by which it can be mounted.

U.S. Pat. No. 5,235,468 (Stephens) shows a trailer hitch alignment device where the mirror is mounted to the forward end of the trailer. The mirror has two halves which fold over on one another at a center line. The mirror is mounted in the lower half, and the upper half serves as a cover to be moved down over the mirror.

U.S. Pat. No. 5,180,182 (Haworth) shows a trailer hitch alignment device which is mounted to the tailgate of a pickup truck. The mirror is a convex mirror to expand the field of vision. In FIG. 2 of the patent, it shows the reflected line of sight going down toward the back of the pickup truck and also toward the trailer hitch.

U.S. Pat. No. 5,111,342 (Quesada) shows a hitch viewing mirror where there is a first version for mounting it to the tailgate of a pickup truck, and a second version mounting the mirror to a back window of a station wagon or van. In the second version there are two angle mounting members, with the upper arm of each angle member attaching to the window by means of the suction cup, and the lower arm portions resting against the window.

U.S. Pat. No. 4,951,913 (Quesada) shows substantially the same apparatus as shown in the later issued Quesada patent (U.S. Pat. No. 5,111,342) discussed immediately above.

U.S. Pat. No. 4,936,669 (Wun) shows a rear mounted mirror device which appears to be more of a general purpose rear mirror to provide the driver with a complete view of the rear of the vehicle so that it can be backed up safely and easily. The mirror is mounted so that it can be moved to various angles, and this is done by means of a motor through a screw rod.

U.S. Pat. No. 4,163,606 (Granno) shows a hitch viewing mirror that is mounted to a trailer between the two gas tanks mounted on the front of the trailer. There is an extendable horizontal arm mounted to a stationary structure, and at the end of the horizontal arm there is a vertically adjustable straight arm to which the mirror is attached. The mirror is convex and enables the person to have a line of sight from the driver's seat to the rearview mirror and thence backwardly to the mirror mounted on a trailer.

U.S. Pat. No. 3,858,966 (Lowell, Jr.) shows a device for facilitating alignment with a trailer hitch, where there is a rotatable shaft 34 on which is mounted a mirror that provides a view of the trailer hitch. At the lower end of the rotatable shaft there is an extendable measuring tape, and the free end of the tape is connected by a ring and a suction cup to the back of the vehicle so that the length of tape 41 gives an alignment reference line from the middle of the rear trailer hitch. There is further an arrow like indicator which also is mounted to the shaft. When this element is pointing directly rearwardly, the vehicle is in proper alignment with the trailer hitch.

U.S. Pat. No. 3,295,914 (Dietrich) shows a hitch guide mirror mounted to the trailer hitch apparatus itself.

To the best knowledge of the applicants, none of the prior art trailer hitch assist devices, such as those described above, have been widely accepted.

It is an object of the present invention to provide such an assembly having a desirable balance of features, such as practicality, effectiveness, convenience of operation, capability of being manufactured at a reasonable cost, and adaptability to be used with various types of vehicles. Also, the mirror of the assembly provides a sufficiently extensive viewing area, and is sufficiently versatile that it can be mounted to a variety of vehicles and still effectively provide a proper view of the hitching area. The assembly should be sufficiently compact so that it can be easily stowed when not in use. Also, the mirror assembly of the present invention is arranged so that it can be easily and reliably positioned and not be affected by the vibrations that may occur due to the operation of the vehicle.

SUMMARY OF THE INVENTION

The mirror assembly of the present invention is designed to assist a vehicle to be positioned relative to a trailer.

This assembly comprises the following:

a. a perimeter frame comprising substantially parallel longitudinal frame members positioned on opposite sides of the frame, and a transverse end member located at an end of the frame;

b. a substantially planar mirror mounted about a transverse axis of rotation and having a stowed position where the mirror is located in a planar containing area of the perimeter frame, and an operating position where the mirror has been rotated from the containing area to extend at an angle from the containing area;

c. rear positioning means adjustably connecting the mirror to the frame;

d. a plurality of mounting members adjustably mounted to the frame so as to be positioned at selected locations on the frame, and having mounting portions by which the mirror can be removably mounted to a vehicle surface.

Desirably each of the mounting member comprises a vehicle mounting portion by which each of the mounting members can be removably attached to the vehicle, and a frame connecting portion by which each mounting frame member can be selectively mounted at locations on the frame. Desirably each mounting member comprises suction cup means. Also, in the preferred form the frame connecting portions comprise resilient gripping means releasably engaging the perimeter frame.

The positioning means comprises an arm means having first and second connecting locations to the frame and to the mirror component, respectively, with the first and second connecting locations being spaced from the axis of rotation of the mirror component. One of the connections is a pivot connection, and the other a slide connection to provide adjustability.

The perimeter frame lies in substantially a single non-curving plane, so that the mirror in its stowed position is positioned closely adjacent to that plane, and the elongate arm member is arranged so that in the stowed position it also lies closely adjacent to that plane.

In the method of the present invention, a mirror assembly is provided as noted above. The mirror is mounted to the vehicle by utilizing the mounting means to attach the frame to the vehicle surface, with the plurality of mounting means being placed at the appropriate positions to make this connection.

Other features of the present invention will be described more fully later herein.

BRIEF DESCRIPTION OF THE DRAWINGS

FIG. 2 is a side elevational view showing the mirror assembly of the present invention mounted to the tailgate of a pickup truck, which is in a position to be moved rearwardly toward a trailer which is to be connected to the vehicle;

FIG. 3 is a view looking into the rear view mirror of the vehicle where there is the image of the hitching area provided by the mirror assembly;

DESCRIPTION OF THE PREFERRED EMBODIMENT

Figure 1:
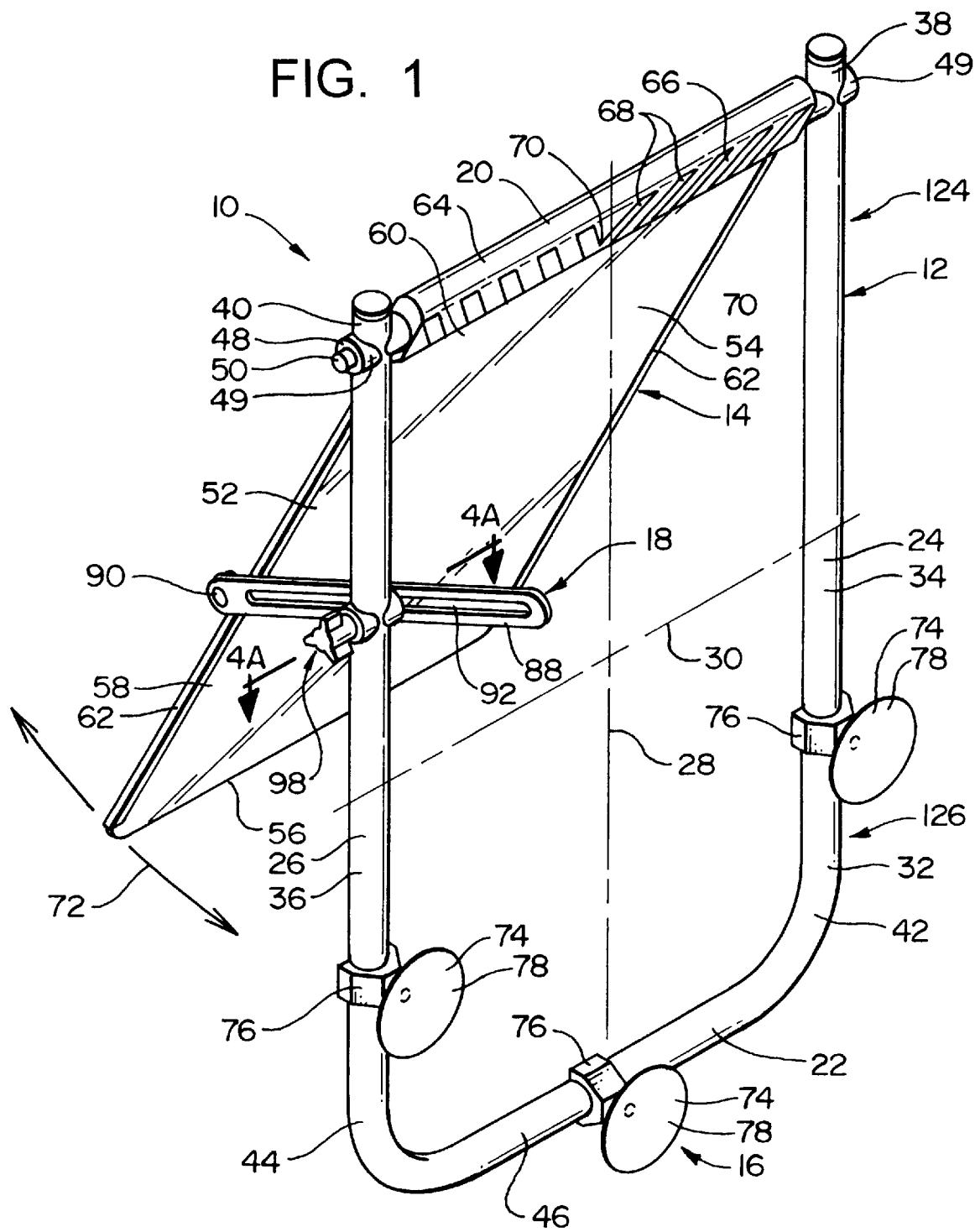
FIG. 1 is an isometric view of the mirror assembly of the present invention.

With reference first to FIG. 1, it can be seen that the mirror assembly 10 of the present invention comprises a perimeter frame 12, a mirror component 14, a mounting means 16, and a mirror positioning component 18. The assembly 10 has a first mirror mounting end 20, a base end 22 and two sides 24 and 26.

For purposes of description, the assembly 10 can be considered as having a longitudinal axis 28 extending between the first and second end portions 22 and a transverse axis 30. The perimeter frame 12 comprises an integral U shaped frame member 32, which in turn comprises a pair of longitudinally extending parallel side legs 34 and 36, each having first ends 38 and 40 and second ends 42 and 44. The two lower ends 42 and 44 of the legs 34 and 36 connect to a transversely extending base member 46. This U shaped member 32 is conveniently made as a single metal tubular member having in cross section a circular configuration which is formed in the U shaped and having circularly curved 90° connecting portions at the lower ends 42 and 44 of the legs 34 and 36.

At the first ends 38 and 40 of the legs 34 and 36, there is a pair of connectors 48 which are, or may be of conventional design. These connectors 48 comprise a pair of connecting elements 49 each having a related semi-circular recess to engage the related leg 38 and 40. Then there is a connecting pin 50 which extends through and interconnects the two member 49 and then extends inwardly a short distance to provide a pivot connection, shown at 51 in FIG. 4.

The mirror component 14 comprises a rectangular mirror 52 having a planar reflecting surface 54. The mirror 54 has a transversely extending swing end 56, side portions 58 and a mounting end 60. There are two elongate side bars 62, each having an elongate inwardly facing recess into which fits a related side edge 58 of the mirror 52. These side bars 62 provide stability for the mirror 52 and prevents it from warping or possibly bending back and forth slightly due to vibrations.

The mounting edge or end 60 Of the mirror 52 is fixedly connected within an elongate slot formed in a header bar 64 that is rotatably mounted at its ends to the pin mounting portions 51 at the upper frame ends 38 and 40. Alternatively, the mirror 52 could be bonded to the bar 64 so that the back surface of the mirror 52 is flush with the back surface of the header bar 64. This header bar 64 has a planar locating surface 66 that is on the same side of the mirror component 14 as the reflecting mirror surface 54. This locating surface 66 has centering indicia 68 thereon, with this indicia 68 indicating a center location 70 along the header bar 64. As shown herein, the indicia 68 comprise a plurality of evenly spaced slanting lines that slant toward the longitudinal center line 28, with the two centermost lines meeting at the center location 70.

In FIG. 1, there is shown an arrow 72 which illustrates the rotating motion of the mirror component 14. The mirror component 14 has a stowed position where it is positioned between the two side legs 34 and 36 to lie in the same plane as occupied by the perimeter frame 12, and also has an operating location where the mirror component 14 is positioned at an angle to the plane occupied by the perimeter frame 12.

Figure 4:
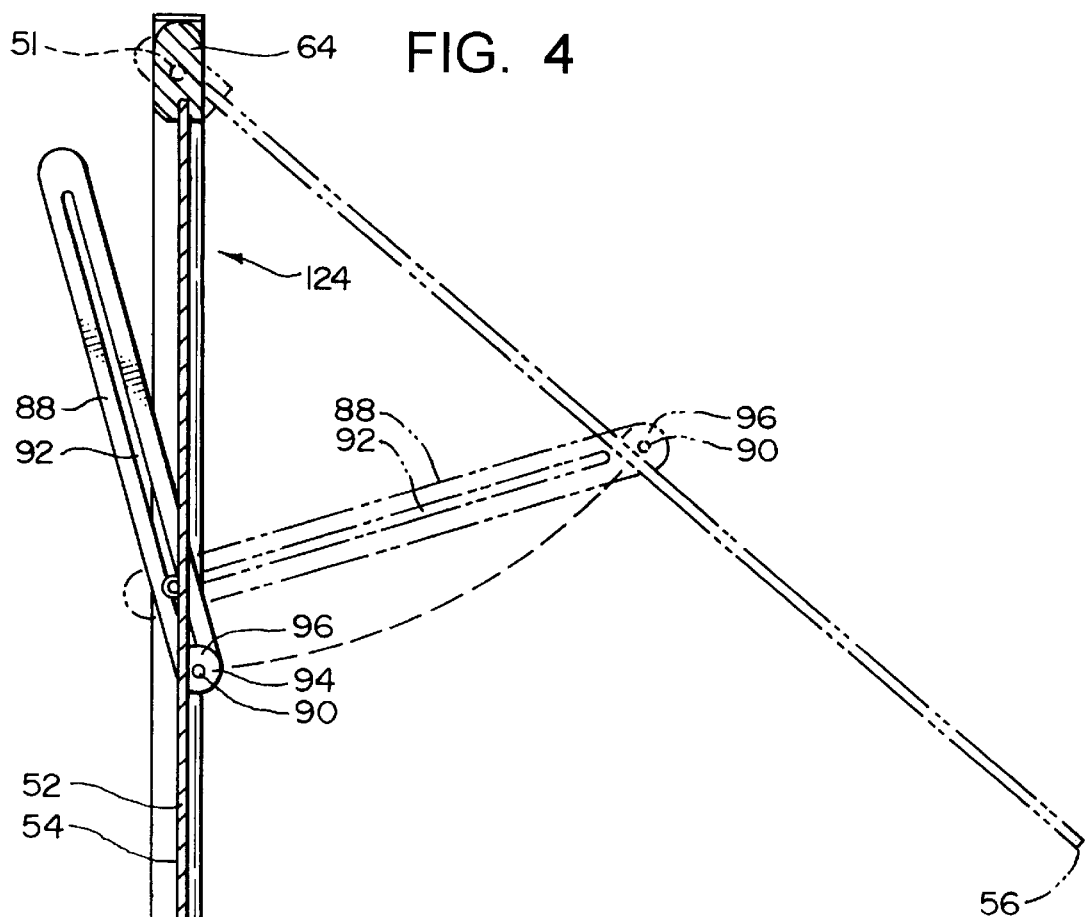
FIG. 4 is a sectional view taken along the longitudinal center line of the mirror assembly of FIG. 1, showing in solid lines the mirror in its stowed location within the perimeter frame, and showing in broken lines the mirror moved outwardly to its operating (i.e. viewing) position.
Figure 4A:
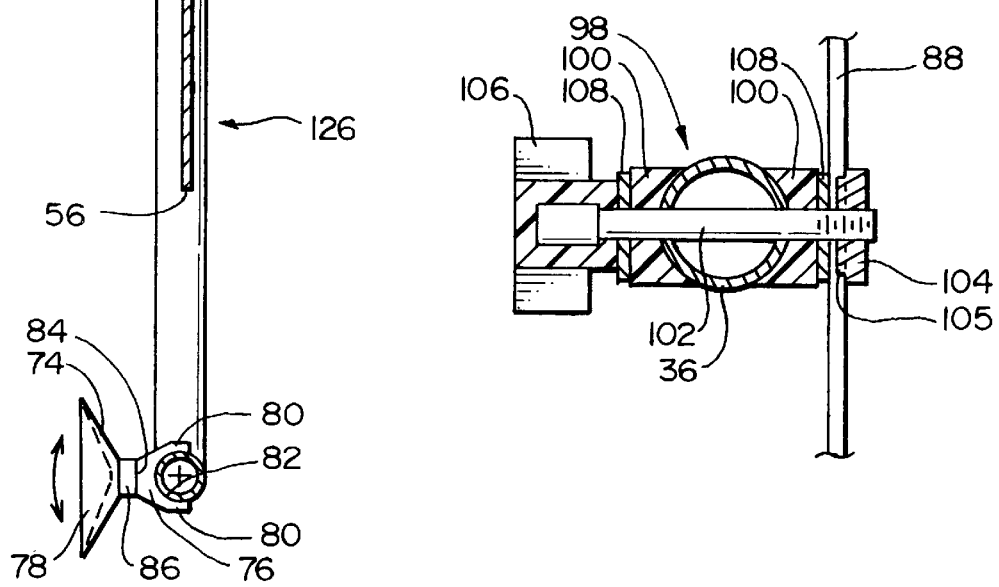
FIG. 4A is a sectional view taken at line 4A—4A of FIG. 1.

The aforementioned mounting means 16 comprises, in the present invention a plurality of individual mounting elements 74, each of which comprises a plastic adjustable frame connector 76 and a suction cup 78 connected to the frame connector 76. As can be seen in FIG. 4, the frame connector 76 has a pair of curved finger elements 80 which define a circular recess 82 that forms a snug fit with the cylindrical outer surface of the U shaped frame member 32.

This frame connector 76 has sufficient resiliency so that it is able to grip the U shaped frame member 32 with sufficient force to reliably grip the U shaped frame member 32, but yet is able to be either removed from the frame member 32, or rotated about, or moved laterally along, the frame member 32. Once the desired position of one or more of the mounting elements 74 is established, the mounting elements(s) can be taped to the frame members 32 (or otherwise secured thereto for a more secure connection. Each frame connector 76 has a portion 84 that engages a matching recess formed in the suction cup connector 76.

The aforementioned mirror positioning means 18 comprises in the present invention a elongate straight positioning arm 88 having an end pivot connecting location 90, and an elongate connecting slot 92 extending a substantial length of the arm 88. The pivot connection is accomplished by means of a bracket 94 fixedly connected to an adjacent side bar 62 and connecting to the arm 88 by means of a pivot connection 96.

The side leg 36 of the frame 32 has at a location spaced a moderate distance from the end 40 a slide connector 98. This connector 98 comprises a pair of spacing blocks 100 mounted on opposite sides of the leg 36 and a thumb screw 102 extending through the members 100 and through an opening in the frame leg 36. The thumb screw 102 extends through the slot 92 of the arm member 88 and is in threaded engagement with a nut 104 that has a protrusion 105 that fits in the slot 92. Thus, as the thumb screw 102 is rotated by grasping its operating end knob 106, the nut 104 presses the arm 88 against the adjacent spacing block 100 to fixedly position the arm 88 relative to the frame 32. Washers 108 are provided at the locations where there is relative slide movement. Alternatively, the knob 106 could be made as a nut which threads onto the screw 102, and tightening is accomplished by rotating the nut 106.

To describe the operation of the present invention, reference is made first to FIG. 2 where there is shown a pickup truck 110, having a cab where there is a driver location 112, and a rear view mirror 114. The mirror assembly 10 of the present invention is mounted to the back surface of the tailgate 116 of the pickup truck. There is a trailer (shown somewhat schematically at 118) having a front hitch 120 of a conventional socket type. Mounted to the rear end of the pickup truck 110 is a conventional ball type hitch 122.

To connect the mirror assembly 10 to the tailgate 116, the three mounting elements 74 are positioned as shown in FIG. 1, where one mounting element 74 is mounted to the base member 46 at the center thereof, and the other two mounting members 74 are connected to the lower parts of the side legs 34 and 36, a moderate distance upwardly from the base member 46. Thus, it is apparent that the three mounting members 74 are positioned in a triangular configuration, so that when the suction cups 76 are pressed against the tailgate surface, the perimeter frame 12 is securely mounted to the tailgate 116.

The most convenient way of mounting and aligning the mirror assembly 10 in this particular situation is simply to mount it to the center location of the tailgate 116, with the longitudinal axis 28 vertically aligned. Thus, the line of sight from the center mounted rear view mirror 114 to the center of the mirror 52 is centered on the ball hitch 122. The mirror 52 is positioned so that the line of sight provided by the mirror 52 has the forward edge thereof directed downwardly a slight distance forward of the ball hitch 122, and there is a field of view approximately two feet rearwardly of the tailgate 116.

The mirror 52 is positioned in its slanted viewing location simply by loosening the thumb screw 102, rotating the mirror to the desired position, with the positioning arm 88 sliding the connecting portion of the thumb screw 102. When the mirror 52 is properly positioned, the thumb screw 102 is tightened to cause the nut 104 to securely hold the mirror 52 in place.

As the driver backs up the pickup truck toward the socket hitch 120 of the trailer 118, the trailer hitch 120 comes into view. As shown in FIG. 3, in this particular situation, the pickup truck is not properly aligned to make the connection of the two hitch components 122 and 120. Accordingly, the driver simply drives forward a short distance, then changes the direction of rearward travel moderately, and the driver has a proper view of both of the hitch elements 122 and 120 so that the driver can properly steer the truck 110 into the proper hitching position.

At this point, it may be helpful to pause and analyze some of the operating features of the present invention. In terms of function, the perimeter frame 12 can be considered as having two portions. There is a first end portion 124 which serves the main function of properly positioning the mirror 52. Then there is the second end portion 126 where the frame base member 46 is located, and this second end portion can be considered the mounting portion 126 by which the mirror assembly 10 is mounted to the vehicle. This mounting portion 126 thus comprises the transverse base member 46 and the adjacent portions of the legs 34 and 36.

It can be seen in FIG. 4 that the outer swing edge 56 of the mirror 52 is, in the stowed position (shown in the solid lines of FIG. 4) is just a short distance away from the frame base member 46. However, when the mirror 52 is swung upwardly to its viewing position, as shown in broken lines of FIG. 4, it will be noted that a line drawn perpendicular to the plane occupied by the frame 12 outwardly toward the swing edge 56 of the mirror 52 is at about the mid-length of the frame 12.

Thus, it can be seen by referring to FIG. 4 and also referring to FIG. 2 that the entire reflecting surface of the mirror 52 is (in the position of FIG. 2) in full view of the rear view mirror 114. Yet there is a sufficient amount of the mounting frame 12 (i.e. the frame mounting portion 126) adjacent to the surface of the tailgate 116 so that a firm mounting can be provided for the assembly 10.

To continue this analysis further, when the mirror 52 is rotated to its stowed position where it lies within the plane of the perimeter frame 12, the mirror component 14 is positioned within or very close to being within, the plane of the perimeter frame 12. Thus, the assembly 10 is very easy to store. Further, the width dimension of the frame 12 is just slightly greater than the width of the mirror 52, and the longitudinal dimension of the entire assembly 10 is only a moderate amount longer than the length of the mirror 52. Thus, it can be seen that (as indicated earlier in this text) one of the benefits of the present invention is achieved in that it provides a relatively compact mirror assembly, and yet provides a mirror having a relatively large reflecting area so as to provide a greater area of view.

Figure 5:
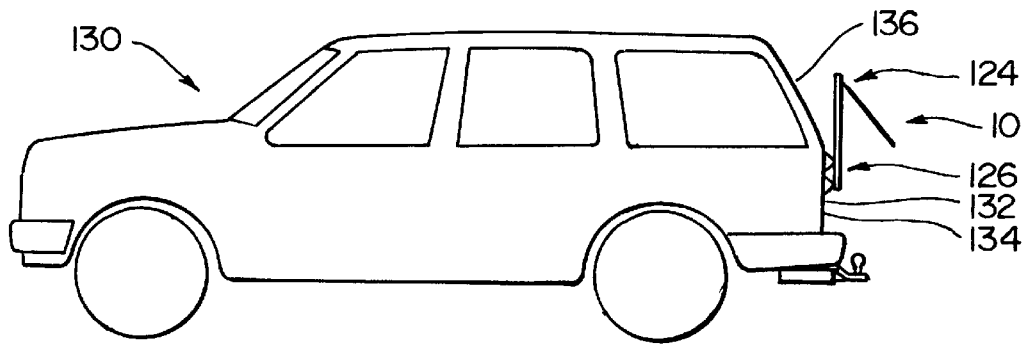
FIG. 5 is side elevational view showing the mirror assembly of the present invention being mounted to the rear end of a van having at the rear end a lower substantially vertical rear body surface, and an upper rear window.

Another advantage of the present invention is that the mechanism by which the mirror 52 is positioned substantially isolates the mirror 52 from any unwanted vibrations, which could come from the motor of the vehicle. One of the main reasons for this is that in the operating position, the positioning arm 88 provides a rigid link so as to provide a triangular structural brace where the moment arm positioning the mirror 52 extends from the pivot location 96 to the pivot connection 51. With the two side bars 62 stabilizing the side edges of the mirror 52, it has been found in actual practice that under normal operating circumstances, there is substantially no noticeable vibration of the mirror 52, Another advantage of the present invention is that it particularly lends itself to be used with various types of vehicles. Reference is first made to FIG. 5, where there is shown a van 130 which has a rear tailgate portion 132 where there is a lower substantially flat vertically aligned surface 134 and an upper rear window 136. It can be seen that the lower mounting portion 126 of the assembly 10 is mounted to the lower surface portion 134, while the upper viewing portion 124 of the assembly 10 is aligned with the rear window 136.

Figure 6:
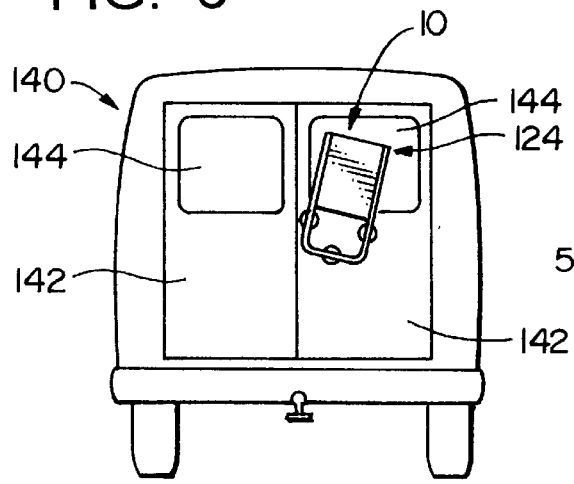
FIG. 6 is a rear view showing the mirror assembly being mounted to a rear door of a van, where the two doors of the van have rear windows.

Similarly, in FIG. 6 there is shown another type of van 140, where there is a pair of rear doors 142, each having a rear window 144. It can be seen that the assembly 10 can easily be mounted to the lower part of one of the doors 142, with the upper viewing portion 124 of the assembly 10 being aligned with the rear window 144.

Figure 7:
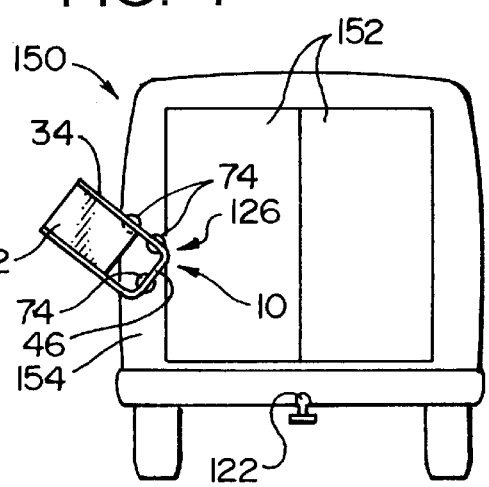
FIG. 7 is a rear view of the mirror assembly being mounted to a rear surface of a side edge portion of a van having rear doors, but where the doors do not have a window.

Another situation is shown in FIG. 7, where there is a van 150 having a pair of rear doors 152 without any window. In this instance, the assembly 10 is mounted so that the mounting portion 126 is mounted to a vertically aligned, rearwardly facing edge surface portion 154 adjacent to one of the doors 152. In this instance, the mounting members 74 have been moved so that there is one mounting member 74 attached to the base member 46, and the other two members 74 attached to the leg 34 at two spaced locations. Thus, there is still the triangular mounting pattern of the three connecting members 74 to provide a stable mount. Yet almost all of the viewing area of the mirror 52 is spaced laterally beyond the side edge of the van 150. Thus, the driver is able to get full view of the mirror 52 through the side mirror on the driver's side of the van 150.

It will also be noted that in the position of FIG. 7, the mirror can be positioned so that there is a direct line of sight from the reflecting surface of the mirror 52 to the rear hitch 122. In this instance, the driver obtains a view which would be obtained if the driver's eyes were positioned at the location of the mirror 52.

Figure 8:
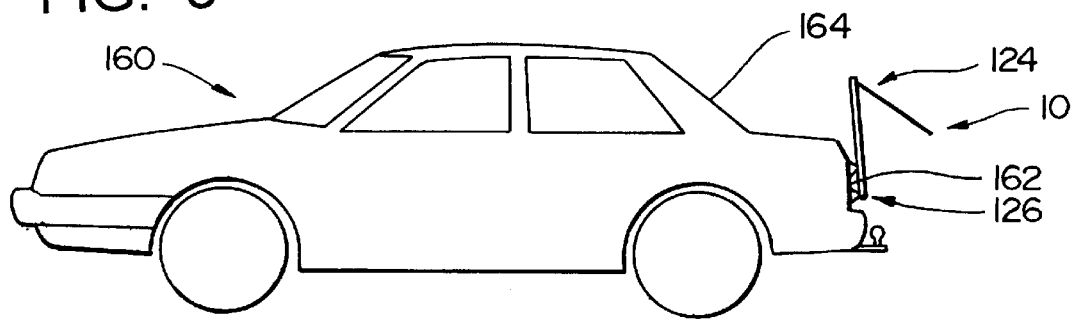
FIG. 8 is a side elevational view showing the mirror assembly of the present invention mounted to the rear surface of the body of a sedan.

Another arrangement is shown in FIG. 8 where there is a sedan 160 of conventional design. There is a rearwardly facing, substantially vertical rear surface portion 162, and the mounting portion 126 Of the assembly 10 is mounted to that surface 162. The upper viewing portion 124 of the assembly 10 is aligned with the rear window portion 164 of the sedan 160.

In use, after the vehicle is backed into the proper position so that the connection to the trailer is made, then the mirror assembly 10 is easily removed simply by loosening the suction cups 78 from the adjacent vehicle surface. Then the mirror assembly 10 can be placed in its stored position, simply by loosening the thumb screw 102, and rotating the mirror 52 down to its stowed position, shown in the full lines of FIG. 4. As indicated above, it can be seen that in this stowed position, the entire mirror assembly is substantially compact, and the length, width and thickness dimensions of the assembly 10 in the stowed position is only slightly more than the overall dimensions of the mirror 52. Thus, the desirable compactness of the stowed assembly is achieved, while still providing a relatively large viewing surface of the mirror 52. it is apparent that various modifications could be made in the present invention without departing from the basic teachings thereof.

For example, while the frame 12 is shown as a unitary U frame, it is obvious that the frame 12 could comprise an entire rectangular perimeter frame where there is transverse member extending through the header bar 64 and interconnecting the first end portions of the legs 34 and 36. Also, the particular arrangements of the positioning arm 88 could be modified to different configurations or arrangements where there would be a more compact collapsed position and an extending operating position.

We claim:

1. A mirror assembly adapted to be positioned on a vehicle to provide a view for an occupant of the vehicle of a rear hitching area to assist the occupant to position the vehicle relative to a trailer to enable the vehicle to be hitched to the trailer, said assembly comprising:

a) a perimeter frame having a first end, a second end, and two sides, said frame having a longitudinal axis extending from said first end to said second end, and a transverse axis, said frame comprising a side frame portion comprising two substantially parallel longitudinal frame side member positioned at opposite sides of the frame, and a transverse end member located at the second end of the frame and interconnecting adjacent end portions of the frame side members, said longitudinal frame side members and said transverse end member defining a planar containing area said frame having a first connecting portion at the first end of the frame and a second vehicle mounting portion spaced from said first end of the frame and comprising said transverse member and portions of said side frame portion adjacent to said second end;

b) a substantially planar mirror component having a first end, a second end, and two side portions, said mirror component being rotatably mounted about a transverse axis of rotation by its first end to the frame at the first end thereof, said mirror component having a stowed position where the mirror is located in the planar containing area of the perimeter frame, and an operating position where the mirror has been rotated from the containing area to extend at an angle to the containing area;

c) mirror positioning means adjustably connecting said mirror component and said frame to locate the mirror component at said operating position, d) vehicle mounting devices connected to the mounting portion of the frame and adapted to be removably connected to the vehicle;

whereby the mounting portion is connected to the vehicle at a location so that the first end portion of the frame is located in a line of sight of the occupant and the mirror component is positioned out of the containing area and in said line of sight at its operating position to provide a view of the hitching area of said vehicle and is moved back to the stowed position for storage.

2. The assembly as recited in claim 1, wherein each of said mounting members comprises a vehicle mounting portion by which each of said mounting members is removably attached to a vehicle, and a frame connecting portion by which each mounting member is selectively mounted at locations on said frame.

3. The assembly as recited in claim 2, wherein each of said mounting members comprises as said vehicle mounting portion a suction cup.

4. The assembly as recited in claim 2, wherein the frame connecting portion of each mounting member comprises resilient gripping means releasably engaging said perimeter frame.

5. The assembly as recited in claim 4, wherein said frame has frame mounting portions having mounting surface portions substantially uniform along a mounting length of said frame, wherein said frame mounting portions of said mounting member engage uniform mounting surface portions along said frame mounting portion.

6. The assembly as recited in claim 5, wherein said frame comprises a tubular frame member, and the frame mounting portions of said mounting members defining with gripping portions thereof recesses matching the cross sectional configuration of the frame members.

7. The assembly as recited in claim 1, wherein said positioning means comprises an arm having first and second connecting locations to said frame and to said mirror component, respectively, with said first and second connecting locations being spaced from the axis of rotation of the mirror component.

8. The assembly as recited in claim 7, wherein one of said connections of said positioning arm is a pivot connection at a fixed pivot location, and the other of said first and second connecting locations is a slide connection, whereby said first and second connecting locations is moved further and closer to one another, with said positioning arm maintaining its connections between said frame and said mirror component.

9. The assembly as recited in claim 8, wherein said arm has an elongate slot extending along a lengthwise dimension of said arm, and one of said frame members and said mirror component have a connecting member engaging said slot so as to have a slide connection with said arm.

10. The assembly as recited in claim 1, wherein said mirror component comprises a mirror, and a header bar, connected to said mirror at the first end of said mirror component, said header bar having rotatable connections to the side members at the first end of the frame.

11. The assembly as recited in claim 10, wherein said frame component also comprises two rigid side bars connected to and extending along side edges of the mirror for stabilizing said mirror.

12. The assembly as recited in claim 1, wherein said perimeter frame lies in substantially a single non-curving plane, and said mirror component, in its stowed position, is positioned closely adjacent to said single non-curving plane.

13. The assembly as recited in claim 12, wherein said positioning means comprises an elongate arm member interconnecting said frame and said mirror component, a connection of said arm to one of said frame and said mirror component being a pivot connection, whereby said arm being arranged so that with said mirror component in the stowed position, said arm is substantially aligned with the plane of said frame, to minimize overall thickness dimension of said assembly.

14. The assembly as recited in claim 1, wherein:
 a. each of said mounting members comprises a vehicle mounting portion by which each of said mounting members is removably attached to a vehicle, and a frame connecting portion by which each mounting member can be selectively mounted at locations on said frame;
 b. said positioning means comprises an arm having first and second connecting locations to said frame and to said mirror component, respectively, with said first and second connecting locations being spaced from the axis of rotation of the mirror component.

15. The assembly as recited in claim 14, wherein the frame connecting portion of each mounting member comprises resilient gripping means releasably engaging said perimeter frame.

16. The assembly as recited in claim 15, wherein one of said connections of said positioning arm is a pivot connection at a fixed pivot location, and the other of said first and second connecting locations is a slide connection, whereby said first and second connecting locations is moved further and closer to one another, with said positioning arm maintaining its connections between said frame and said mirror component.

17. A method of utilizing a mirror assembly to assist a vehicle to be positioned relative to a trailer, said method comprising:
 a. providing a perimeter frame having a first end, a second end, and two sides, said frame having a longitudinal axis extending from said first end to said second end, and a transverse axis, said frame comprising two substantially parallel longitudinal frame members positioned at opposite sides of the frame, and a transverse end member located at the second end of the frame and interconnecting adjacent end portions of the frame side members, said longitudinal frame members and said transverse end member defining a planar containing area;
 b. providing a substantially planar mirror component having a first end, a second end, and two side portions, said mirror component being rotatably mounted about a transverse axis of rotation by its first end to the frame at the first end thereof, said mirror component having a stowed position where the mirror is located in the planar containing area of the perimeter frame, and an operating position where the mirror has been rotated from the containing area to extend at an angle from the containing area;
 c. mounting said perimeter frame to said vehicle by connecting a plurality of frame mounting members to said frame by means of a frame connecting portion by which each mounting member is adjustably mounted at select locations on said frame, and utilizing mounting portion of said mounting members to removably mount the mirror to a vehicle surface;
 d. utilizing mirror positioning means to adjustably connect said mirror component and said frame to locate the mirror at a desired angular position.

18. The method as recited in claim 17, wherein each of said mounting members comprises as said vehicle mounting portion a suction cup means, and the frame connecting portion of each mounting member comprises resilient gripping means releasably engaging said perimeter frame.

19. The method as recited in claim 17, wherein said positioning means comprises an arm having first and second connecting locations to said frame and to said mirror component, respectively, with said first and second connecting locations being spaced from the axis of rotation of the mirror component, one of said connections of said positioning arm being a pivot connection at a fixed pivot location, and the other of said first and second connecting locations being a slide connection, said method comprising said first and second connecting locations relative to one another, to position said mirror at the desired angular location.

20. The method as recited in claim 17, wherein said perimeter frame lies in substantially a single non-curving plane, and said mirror component, in its stowed position, is positioned closely adjacent to said single non-curving plane, and said positioning means comprises an elongate arm member interconnecting said frame and said mirror component, a connection of said arm to one of said frame and said mirror component being a pivot connection, moving said arm and said mirror component into the stowed position, so that said arm is substantially aligned with the plane of said frame, to minimize overall thickness dimension of said assembly.

* * * * *